United States Patent [19]

Nagamine et al.

[11] Patent Number: 4,500,614

[45] Date of Patent: Feb. 19, 1985

[54] ALKALINE CELL

[75] Inventors: Akio Nagamine; Akira Hayashi, both of Tokyo; Kazumasa Yoshida, Samukawa; Kojiro Miyasaka, Tokyo, all of Japan

[73] Assignee: Toshiba Battery Co., Ltd., Tokyo, Japan

[21] Appl. No.: 499,884

[22] Filed: Jun. 1, 1983

[30] Foreign Application Priority Data

Jun. 11, 1982 [JP] Japan .................... 57-100154
Jun. 11, 1982 [JP] Japan .................... 57-100155

[51] Int. Cl.³ ............................................. H01M 6/04
[52] U.S. Cl. .................................. 429/206; 429/218; 429/230
[58] Field of Search ............... 429/229, 230, 231, 206, 429/218, 190

[56] References Cited

U.S. PATENT DOCUMENTS 4,144,382 3/1979 Takeda et al. .................. 429/230 X
4,376,810 3/1983 Takeda et al. .................. 429/230 X Primary Examiner—Anthony Skapars
Attorney, Agent, or Firm—Oblon, Fisher, Spivak, McClelland & Maier

[57] ABSTRACT

An alkaline cell is provided which comprises an anode prepared by amalgamating an alloy powder made of zinc and at least two metals selected from the group consisting of gallium, indium and thallium, wherein the amount of mercury is 0.05 to 1.8% by weight based on the weight of zinc. An alkaline cell is also provided which comprises an anode prepared by forming on the particles of a zinc powder an alloy layer made of mercury and at least two metals selected from the group consisting of gallium, indium and thallium, wherein the amount of mercury is 0.05 to 1.80% by weight based on the weight of the zinc powder.

3 Claims, 1 Drawing Figure

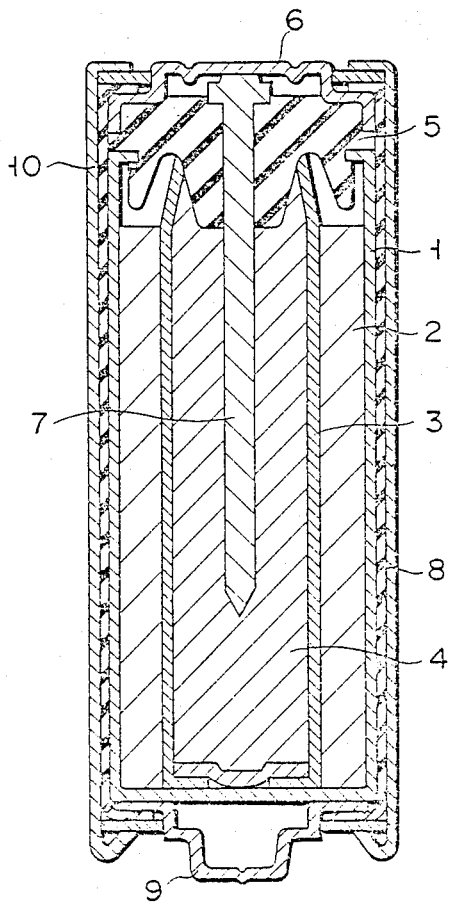

//  4,500,614

ALKALINE CELL

BACKGROUND OF THE INVENTION

The present invention relates to an alkaline cell and, more particularly, to an improvement in an anode of an alkaline cell.

In a conventional alkaline cell such as an alkaline manganese cell, a silver oxide cell or a zinc air cell, a zinc powder is used to increase the reaction area of the anode and is amalgamated so as to increase a hydrogen overvoltage and to prevent the generation of hydrogen gas. However, since the surface area is large, the amount of mercury required is 5 to 10% by weight based on the weight of the zinc powder. In a large size alkaline cell such as an LR20, LR14 or LR6 (JIS), the amount of mercury per cell is also increased, since the amount of zinc used for the anode is large.

To reduce the amount of mercury which may pollute the environment, to prevent corrosion of zinc in an alkaline electrolyte so as to prevent generation of hydrogen gas, and to prevent leakage of the electrolyte, it has been proposed to add various metals to zinc.

For example, Japanese Patent Disclosure No. 52-74833 discloses the use of a zinc powder coated with an indium (In)-mercury (Hg) alloy for the anode. Japanese Patent Disclosure No. 53-30741 discloses the use of a zinc powder coated with a gallium (Ga)-indium (In)-mercury (Hg) alloy for the anode.

In Japanese Patent Disclosure No. 53-103127, it is proposed to coat a zinc powder with a mercury amalgamated alloy of indium (In), gallium (Ga), or a mixture thereof. The amount of indium or gallium used is 2 to 10% by weight based on the weight of zinc, while the amount of mercury used is 2 to 14% by weight based on the weight of zinc.

Japanese Patent Disclosure No. 53-41733 also discloses coating of a zinc powder with tantalum alone or tantalum alloys such as Ta-Ga and Ta-In, after their amalgamation with or without a small amount of mercury. This prior art does not disclose the particular amount of mercury.

Furthermore, Japanese Patent Disclosure No. 47-35727 proposes an alkaline cell which uses an anode obtained by amalgamating with 10% by weight of mercury a zinc alloy containing gallium (Ga), lead (Pb), or germanium (Ge).

SUMMARY OF THE INVENTION

It is an object of the present invention to provide an alkaline cell which uses a smaller amount of mercury than a conventional alkaline cell and which is capable of preventing generation of hydrogen gas and a decrease in heavy-load discharge performance.

According to a first aspect of the present invention, there is provided an alkaline cell comprising an anode prepared by amalgamating an alloy powder made of zinc and at least two metals selected from gallium, indium and thallium, wherein the amount of mercury is 0.05 to 1.8% by weight based on the weight of zinc.

According to a second aspect of the present invention, there is also provided an alkaline cell comprising an anode prepared by forming on the particles of a zinc powder an alloy layer made of mercury and at least two metals selected from gallium, indium and thallium, wherein the amount of mercury is 0.5 to 1.8% by weight based on the weight of zinc.

BRIEF DESCRIPTION OF THE DRAWINGS

The drawing is a longitudinal sectional view of an alkaline cell according to an embodiment of the present invention.

DETAILED DESCRIPTION OF THE PREFERRED EMBODIMENTS

An amalgamated alloy powder for constituting an anode of an alkaline cell according to the first aspect may be prepared in the following manner. Predetermined amounts of at least two metals selected from gallium, indium and thallium are added to molten zinc, and are mixed to alloy them, thereby providing an alloy powder. While the alloy powder is stirred in a weak alkaline aqueous solution, metal mercury is added to cause amalgamation. The reaction product is rinsed with water and dried under reduced pressure at about 60° C. to prepare an amalgamated alloy powder.

A zinc powder having an alloy layer for constituting an anode of an alkaline cell according to the second aspect may be prepared in the following manner. First, mercury is added to at least two metals selected from gallium, indium and thallium to provide an amalgamated alloy. The resultant amalgamated alloy is added to a weak alkaline aqueous solution heated to about 80° C. together with addition of a high-purity zinc powder. As a result, an amalgamated alloy layer of these metals is formed on the surface of the zinc powder. The product obtained is rinsed with water and dried at about 60° C. under reduced pressure.

The metal powder of the present invention prepared for an anode in the above manner is preferably added to an alkaline electrolyte saturated with zinc oxide, and is then formed into a gelled anode using a gelling agent such as sodium polyacrylate.

EXAMPLE 1

Alkaline manganese cells were prepared which had a structure as shown in the drawing and which had anodes each containing a metal powder having a composition shown in Table 1 below. The obtained cells were subjected to a heavy load discharge characteristic test and a mercury elution test. The obtained results are also shown in Table 1.

Referring to the drawing, reference numeral 1 denotes a metal container which holds therein a cathode composition 2 consisting of manganese dioxide and flake graphite. A separator 3 consists of a pulp and synthetic fiber, and an anode 4 is filled therein. The anode 4 has a composition shown in Table 1 below which is obtained by gelling with sodium polyacrylate a mixture of a metal powder prepared in accordance with the first aspect of the present invention described above and an alkaline electrolyte saturated with zinc oxide. An insulating gasket 5 consists of a synthetic rubber or polyethylene. A brass current collector 7 welded to an anode terminal plate 6 is inserted into the central portion of the anode 4. An insulating tube 8 coats the outer periphery of a cathode terminal plate 9, the outer periphery of the anode terminal plate 6, and the outer surface of the metal container 1. The lower and upper open ends of an outer metal can 10 are crimped.

TABLE 1

| Sample No. | Alloy composition (wt %) | | | | Utilization rate of zinc (%) | | Mercury elution (μg/l) |
| --- | --- | --- | --- | --- | --- | --- | --- |
| | Zn | Ga | In | Tl | Hg | Discharge at 250 mA | Discharge at 500 mA | |

| Sample No. | Zn | Ga | In | Tl | Hg | Discharge at 250 mA | Discharge at 500 mA | Mercury elution (μg/l) |
| --- | --- | --- | --- | --- | --- | --- | --- | --- |
| Example 1 | | | | | | | | |
| 1 | 98.26 | 0.12 | 0.07 | 1.5 | 0.05 | 94 | 82 | 0 |
| 2 | 97.31 | 0.12 | 0.07 | 1.5 | 1.00 | 95 | 84 | 0 |
| 3 | 96.71 | 0.13 | 0.06 | 1.3 | 1.80 | 96 | 85 | 0 |
| Comparative Example 1 | | | | | | | | |
| 4 | 98.51 | 0.13 | 0.06 | 1.3 | — | 62 | 47 | 0 |
| 5 | 98.47 | 0.13 | 0.06 | 1.3 | 0.04 | 83 | 72 | 0 |
| 6 | 96.51 | 0.13 | 0.06 | 1.3 | 2.00 | 96 | 85 | 0.01 |
| Prior art | | | | | | | | |
| 7 | 93.6 | — | — | — | 6.4 | 93 | 81 | 0.3 |

In Table 1 above, the amount of zinc of the anode consumed was calculated from the discharge duration up to the terminal voltage of 0.9 V when a cell is discharged at a constant current of 250 mA and 500 mA, respectively. The amount of mercury elution was determined from the chemical analysis of mercury eluted in ground one year after a cell having a metal can with a hole was buried underground and sprayed with artificial salt water.

With the alloy compositions of Samples 1 to 3 of Example 1, the utilization rate of zinc was higher than in the case of the prior art cell which contained mercury amalgamated in the amount of 6.4% by weight with a high-purity zinc powder.

This is considered to be attributable to the fact that, since metals such as gallium, indium and thallium prevent corrosion of zinc, the self-discharge of zinc in the electrolyte in prevented even when the amount of mercury is 0.05 to 1.8% by weight based on the weight of zinc.

In order to further clarify the effects of the present invention, the amount of hydrogen gas generated was measured so as to evaluate the corrosion resistance of the anode zinc. The following test procedures were followed. For each of Sample Nos. 1 to 7, a zinc alloy powder was immersed in the amount of 5.00 g in 3.5 ml of 35% by weight potassium hydroxide solution. After the solution had been left to stand at 45° C. for 72 hours, the generated hydrogen gas was trapped and was measured (ml/g/day). The obtained results are shown in Table 2 below.

TABLE 2

| | Sample No. | Mercury (wt %) | Amount of hydrogen gas generated (ml/g/day) |
| --- | --- | --- | --- |
| Example 1 | 1 | 0.05 | 0.006 |
| | 2 | 1.00 | 0.003 |
| | 3 | 1.80 | 0.002 |
| Comparative Example 1 | 4 | — | 0.045 |
| | 5 | 0.04 | 0.013 |
| | 6 | 2.00 | 0.002 |
| Prior art | 7 | 6.40 | 0.009 |

As may be seen from Table 2, when the amount of mercury is within the range of 0.05 to 1.80% by weight, the amount of hydrogen gas generated remains within the range of 0.002 to 0.006 ml/g/day. In contrast to this, in the case of the cell with no addition of mercury (Sample No. 4) and of the cell with 0.04% by weight of mercury added (Sample No. 5) of Comparative Example 1, the amount of hydrogen gas generated was 0.045 ml/g/day and 0.013 ml/g/day, respectively. It can be seen from this that the metals selected according to the present invention alloy with zinc to prevent corrosion of zinc.

In Examples 2 to 4 to be described below, two metals selected from gallium, indium and thallium were melted with zinc, and amalgamation of the resulting alloy powder with mercury was performed in a similar manner to that in Example 1 above. The amount of zinc consumed and the amount of mercury elution were tested using the same type of alkaline cell of the same structure as that used in Example 1, and the amount of hydrogen gas generated was also measured in the same manner as in Example 1.

EXAMPLE 2

Anodes were used each of which was obtained by amalgamating with mercury a zinc-gallium-thallium alloy powder. The resulting alloy composition is shown in Table 3 below, and the amount of hydrogen gas generated is shown in Table 4 below.

TABLE 3

| Sample No. | Zn | Ga | In | Tl | Hg | Discharge at 250 mA | Discharge at 500 mA | Mercury elution (μg/l) |
| --- | --- | --- | --- | --- | --- | --- | --- | --- |
| Example 2 | | | | | | | | |
| 8 | 96.30 | 0.10 | — | 1.80 | 1.80 | 95 | 83 | 0 |
| 9 | 98.24 | 0.10 | — | 1.60 | 0.06 | 92 | 80 | 0 |
| Comparative Example 2 | | | | | | | | |
| 11 | 98.04 | 0.11 | — | 1.85 | — | 62 | 47 | 0 |
| 12 | 98.00 | 0.11 | — | 1.85 | 0.04 | 81 | 70 | 0 |
| 13 | 96.04 | 0.11 | — | 1.85 | 2.00 | 95 | 84 | 0.01 |

TABLE 4

| | Sample No. | Mercury (wt %) | Amount of hydrogen gas generated (ml/g/day) |
| --- | --- | --- | --- |
| Example 2 | 8 | 1.80 | 0.003 |
| | 9 | 0.06 | 0.010 |
| Comparative Example 2 | 11 | — | 0.042 |
| | 12 | 0.04 | 0.014 |
| | 13 | 2.00 | 0.002 |

EXAMPLE 3

Anodes were used each of which was obtained by amalgamating with mercury a zinc-indium-thallium alloy powder. The resulting alloy composition is shown in Table 5 below, and the amount of hydrogen gas generated is also known in Table 6 below.

TABLE 5

| Sample No. | Zn | Ga | In | Tl | Hg | Discharge at 250 mA | Discharge at 500 mA | Mercury elution (μg/l) |
| --- | --- | --- | --- | --- | --- | --- | --- | --- |
| Example 3 | | | | | | | | |
| 14 | 95.97 | — | 0.23 | 2.00 | 1.80 | 95 | 83 | 0 |
| 15 | 97.80 | — | 0.25 | 1.90 | 0.05 | 92 | 79 | 0 |
| Comparative Example 3 | | | | | | | | |
| 16 | 97.64 | — | 0.26 | 2.10 | — | 60 | 45 | 0 |
| 17 | 97.60 | — | 0.26 | 2.10 | 0.04 | 82 | 70 | 0 |

TABLE 5-continued

| Sample No. | Alloy composition (wt %) | | | | Utilization rate of zinc (%) | | Mercury elution (μg/l) |
| --- | --- | --- | --- | --- | --- | --- | --- |
| | Zn | Ga | In | Tl | Hg | Discharge at 250 mA | Discharge at 500 mA | |
| 18 | 95.64 | — | 0.26 | 2.10 | 2.00 | 95 | 84 | 0.01 |

TABLE 6

| | Sample No. | Mercury (wt %) | Amount of hydrogen gas generated (ml/g/day) |
| --- | --- | --- | --- |
| Example 3 | 14 | 1.80 | 0.005 |
| | 15 | 0.05 | 0.012 |
| Comparative Example 3 | 16 | — | 0.058 |
| | 17 | 0.04 | 0.015 |
| | 18 | 2.00 | 0.004 |

EXAMPLE 4

Anodes were used each of which was obtained by amalgamation with mercury a zinc-gallium-indium alloy powder. The resulting alloy composition is shown in Table 7 below, and the amount of hydrogen gas generated is also shown in Table 8 below.

TABLE 7

| Sample No. | Alloy composition (wt %) | | | | | Utilization rate of zinc (%) | | Mercury elution (μg/l) |
| --- | --- | --- | --- | --- | --- | --- | --- | --- |
| | Zn | Ga | In | Tl | Hg | Discharge at 250 mA | Discharge at 500 mA | |
| Example 4 | | | | | | | | |
| 19 | 97.25 | 1.20 | 0.25 | — | 1.30 | 95 | 83 | 0 |
| 20 | 98.59 | 1.10 | 0.24 | — | 0.07 | 92 | 79 | 0 |
| Comparative Example 4 | | | | | | | | |
| 21 | 98.44 | 1.30 | 0.26 | — | — | 58 | 43 | 0 |
| 22 | 98.40 | 1.30 | 0.26 | — | 0.04 | 80 | 69 | 0 |
| 23 | 96.44 | 1.30 | 0.26 | — | 2.00 | 95 | 83 | 0.01 |

TABLE 8

| | Sample No. | Mercury (wt %) | Amount of hydrogen gas generated (ml/g/day) |
| --- | --- | --- | --- |
| Example 4 | 19 | 1.30 | 0.006 |
| | 20 | 0.07 | 0.018 |
| Comparative Example 4 | 21 | — | 0.072 |
| | 22 | 0.04 | 0.023 |
| | 23 | 2.00 | 0.010 |

A comparison of the results obtained in Examples 1 to 4 reveals the following. A cell having an anode containing an alloy consisting of zinc with three types of metal, namely, of gallium, indium and thallium, and amalgamated with mercury provides excellent characteristics regarding the amount of zinc consumed and the amount of hydrogen gas generated. However, even with a cell having an anode containing an alloy consisting of zinc and two metals selected from gallium, indium and thallium, the amount of zinc consumed is a minimum of 92% upon discharge at 250 mA and is a minimum of 79% upon discharge at 500 mA. Although this value is slightly degraded from that obtainable with a prior art cell obtained by amalgamating zinc with 6.4% by weight of mercury, this will not present any substantial problem in the use of the cell.

EXAMPLE 5

Alkaline cells were prepared each of which had an anode composition as shown in Table 9 below, consisting of a metal powder prepared in the same manner as that described with reference to the second aspect of the present invention. The resultant cell was subjected to the heavy load discharge characteristic test and the mercury elution test. The obtained results are shown in Table 9 below.

TABLE 9

| Sample No. | Anode metal composition (wt %) | | | | | Utilization rate of zinc (%) | | Mercury elution (μg/l) |
| --- | --- | --- | --- | --- | --- | --- | --- | --- |
| | Zn | Ga | In | Tl | Hg | Discharge at 250 mA | Discharge at 500 mA | |
| Example 5 | | | | | | | | |
| 24 | 96.53 | 0.12 | 0.05 | 1.50 | 1.80 | 96 | 84 | 0 |
| 25 | 98.37 | 0.12 | 0.06 | 1.40 | 0.05 | 94 | 81 | 0 |
| Comparative Example 5 | | | | | | | | |
| 26 | 98.22 | 0.12 | 0.06 | 1.60 | — | 63 | 48 | 0 |
| 27 | 98.18 | 0.12 | 0.06 | 1.60 | 0.04 | 84 | 73 | 0 |
| 28 | 96.22 | 0.12 | 0.16 | 1.60 | 2.00 | 96 | 85 | 0.01 |
| Prior art | | | | | | | | |
| 29 | 93.50 | — | — | — | 6.50 | 93 | 81 | 0.3 |

In Table 9, the utilization rate of zinc and the amount of mercury eluted were measured by the same method as used in Example 1.

In this example, the utilization rate of zinc for each cell was equivalent to or more than 6.5% by weight of Sample No. 29 (prior art). This is because coating of the zinc surface with a mercury amalgamated alloy layer of gallium, indium and thallium prevents elution of zinc into the electrolyte. Furthermore, since these metals are present in relatively high concentrations at the surface of the zinc powder, the zinc is protected from corrosion. Accordingly, even if the amount of mercury used is within the range between 0.05% by weight and 1.8% by weight, the heavy load discharge characteristics may not be impaired. Samples 26 to 28 of Comparative Example 5 were tested so as to confirm the effect of the addition of mercury. When the amount of mercury used is 0.04% by weight or less, the amount of zinc consumed is decreased and the desired heavy load discharge characteristics may not be obtained. When the amount of mercury used is 1.8% by weight or more, although the discharge performance is good, a greater amount of mercury elutes, causing a pollution problem.

In order to further clarify the effects obtained with the present invention, the amount of hydrogen gas released was measured following the same procedures as in Example 1. The obtained results are shown in Table 10 below.

TABLE 10

| | Sample No. | Mercury (wt %) | Amount of hydrogen gas generated (ml/g/day) |
| --- | --- | --- | --- |
| Example 5 | 24 | 1.80 | 0.002 |
| | 25 | 0.05 | 0.006 |
| Comparative Example 5 | 26 | — | 0.042 |
| | 27 | 0.04 | 0.010 |
| | 28 | 2.00 | 0.002 |

TABLE 10-continued

| Sample No. | Mercury (wt %) | Amount of hydrogen gas generated (ml/g/day) |
|---|---|---|
| Prior art 29 | 6.50 | 0.009 |

As may be seen from the above table, when the amount of mercury used is within the range of 0.05 to 1.80% by weight, the amount of hydrogen gas generated is within the range of 0.002 to 0.006 ml/g/day, which is smaller than 0.009 ml/g/day of the prior art cell. Comparing the cells of Example 5 with those of Comparative Example 5, when the amount of mercury used is less than 0.05% by weight, the amount of hydrogen gas generated increases, which inadvertently causes selfdischarge of zinc during storage of the cells. Accordingly, the amount of mercury used must be 0.05% by weight or more and is preferably 1.80% by weight or less from the viewpoint of a smaller amount of mercury etuted (Table 9).

In Examples 6 to 8 to be described below, the surface of pure zinc is coated with a mercury amalgamated alloy layer consisting of at least two metals selected from gallium, indium and thallium. The amalgamated alloy layer was prepared following the same procedures as those in Example 5. The resultant cells were measured for the utilization rate of zinc and the amount of mercury eluted. Measurements were performed using alkaline cells of the same structure as those in Example 1 above, and the amount of hydrogen gas generated was measured by the same method as in Example 1.

EXAMPLE 6

Anodes were used each of which was obtained by coating the surface of a pure zinc powder with a mercury amalgamated alloy consisting of gallium and thallium.

The anode composition is shown in Table 11 below, and the amount of hydrogen gas generated is shown in Table 12 below.

TABLE 11

| Sample No. | Anode metal composition (wt %) | | | | | Utilization rate of zinc (%) | | Mercury elution (μg/l) |
|---|---|---|---|---|---|---|---|---|
| | Zn | Ga | In | Tl | Hg | Discharge at 250 mA | Discharge at 500 mA | |
| Example 6 | | | | | | | | |
| 30 | 96.30 | 0.10 | — | 1.80 | 1.80 | 96 | 83 | 0 |
| 31 | 98.24 | 0.10 | — | 1.60 | 0.06 | 94 | 80 | 0 |
| Comparative Example 6 | | | | | | | | |
| 32 | 98.04 | 0.11 | — | 1.85 | — | 63 | 48 | 0 |
| 33 | 98.26 | 0.10 | — | 1.60 | 0.04 | 84 | 72 | 0 |
| 34 | 96.30 | 0.10 | — | 1.60 | 2.00 | 96 | 83 | 0.01 |

TABLE 12

| | Sample No. | Mercury (wt %) | Amount of hydrogen gas generated (ml/g/day) |
|---|---|---|---|
| Example 6 | 30 | 1.80 | 0.003 |
| | 31 | 0.06 | 0.009 |
| Comparative Example 6 | 32 | — | 0.038 |
| | 33 | 0.04 | 0.013 |
| | 34 | 2.00 | 0.002 |

EXAMPLE 7

Anodes were used each of which was obtained by coating the surface of a pure zinc powder with a mercury amalgamated alloy layer consisting of indium and thallium.

The anode metal composition is shown in Table 13 below, and the amount of hydrogen gas generated is shown in Table 14 below.

TABLE 13

| Sample No. | Anode metal composition (wt %) | | | | | Utilization rate of zinc (%) | | Mercury elution (μg/l) |
|---|---|---|---|---|---|---|---|---|
| | Zn | Ga | In | Tl | Hg | Discharge at 250 mA | Discharge at 500 mA | |
| Example 7 | | | | | | | | |
| 35 | 95.95 | — | 0.25 | 2.00 | 1.80 | 96 | 83 | 0 |
| 36 | 97.80 | — | 0.23 | 1.90 | 0.07 | 94 | 79 | 0 |
| Comparative Example 7 | | | | | | | | |
| 37 | 97.64 | — | 0.26 | 2.1 | — | 60 | 45 | 0 |
| 38 | 97.60 | — | 0.26 | 2.1 | 0.04 | 84 | 72 | 0 |
| 39 | 95.64 | — | 0.26 | 2.1 | 2.00 | 96 | 83 | 0.01 |

TABLE 14

| | Sample No. | Mercury (wt %) | Amount of hydrogen gas generated (ml/g/day) |
|---|---|---|---|
| Example 7 | 35 | 1.80 | 0.004 |
| | 36 | 0.07 | 0.012 |
| Comparative Example 7 | 37 | — | 0.058 |
| | 38 | 0.04 | 0.013 |
| | 39 | 2.00 | 0.004 |

EXAMPLE 8

Anodes were used each of which was obtained by coating the surface of a pure zinc powder with a mercury amalgamated alloy layer consisting of gallium and indium. The anode composition is shown in Table 15 below, and the amount of hydrogen gas generated is shown in Table 16 below.

TABLE 15

| Sample No. | Anode metal composition (wt %) | | | | | Utilization rate of zinc (%) | | Mercury elution (μg/l) |
|---|---|---|---|---|---|---|---|---|
| | Zn | Ga | In | Tl | Hg | Discharge at 250 mA | Discharge at 500 mA | |
| Example 8 | | | | | | | | |
| 40 | 97.25 | 1.20 | 0.25 | — | 1.30 | 95 | 83 | 0 |
| 41 | 98.59 | 1.10 | 0.24 | — | 0.07 | 93 | 79 | 0 |
| Comparative Example 8 | | | | | | | | |
| 42 | 98.44 | 1.30 | 0.26 | — | — | 58 | 43 | 0 |
| 43 | 98.40 | 1.30 | 0.26 | — | 0.04 | 82 | 73 | 0 |
| 44 | 96.44 | 1.30 | 0.26 | — | 2.00 | 95 | 83 | 0.01 |

TABLE 16

| | Sample No. | Mercury (wt %) | Amount of hydrogen gas generated (ml/g/day) |
|---|---|---|---|
| Example 8 | 40 | 1.30 | 0.006 |
| | 41 | 0.07 | 0.016 |
| Comparative Example 8 | 42 | — | 0.072 |
| | 43 | 0.04 | 0.020 |

TABLE 16-continued

| Sample No. | Mercury (wt %) | Amount of hydrogen gas generated (ml/g/day) |
| --- | --- | --- |
| 44 | 2.00 | 0.008 |

A comparison of the above Examples reveals the following. A cell having an anode prepared by coating the surface of a pure zinc powder with a mercury amalgamated alloy layer consisting of three metals, i.e., gallium, indium and thallium, exhibits good characteristics regarding the utilization rate of zinc and the amount of hydrogen gas released. However, even with a cell having an anode prepared by coating the surface of a zinc powder with a mercury amalgamated alloy layer consisting of two metals selected from gallium, thallium and indium, a minimum of 93% of zinc is consumed upon discharge at 250 mA and a minimum of 95% is consumed upon discharge at 500 mA. These values are equivalent to that of a prior art cell which has an anode containing 6.5% by weight of mercury added by amalgamation. Thus, such a cell can achieve a discharge performance equivalent to that of the prior art cell even though the amount of mercury is decreased. The reason for this may be surmised as follows. Since a metal which results in a high hydrogen overvoltage is formed on the surface of a pure zinc powder as an alloy amalgamated with mercury, these metals are present on the surface of the zinc powder in higher concentrations than are obtainable in the case wherein the metals are uniformly dispersed in molten zinc. Therefore, selfdischarge of zinc is prevented, and the heavy load discharge performance is improved. The reason why the amount of mercury is limited to be within the range between 0.05% by weight and 1.80% by weight is as follows. Although the amount of mercury must be at least 0.05% by weight in consideration of the required heavy load discharge performance, an amount of mercury exceeding 1.80% by weight is not desirable considering the pollution problem caused by mercury elution. Furthermore, even when zinc is consumed by discharge, mercury remains within the cell in the form of an alloy with gallium, indium, and thallium, and thus causes hardly any elution.

In the present invention, the metals to be added to alloy with mercury are limited to three types, namely, gallium, indium and thallium. This is because these three types of metals exhibit particularly good effects in imparting corrosion resistance. When only one of these metals is used, the utilization rate of zinc is decreased and the amount of hydrogen gas generated is large and the effect of the present invention may not be obtained.

In summary, an alkaline cell having an excellent heavy load performance and a reduced amount of mercury may be provided according to the present invention.

What we claim is:

1. An alkaline cell comprising an anode prepared by forming on the particles of a zinc powder an alloy layer made of mercury and at least two metals selected from the group consisting of gallium, indium and thallium, wherein an amount of mercury is 0.05 to 1.80% by weight based on a weight of the zinc powder.

2. An alkaline cell according to claim 1, wherein forming of the alloy layer is performed by mixing the zinc powder and the alloy in a heated weak alkaline aqueous solution.

3. An alkaline cell according to claim 1, wherein the anode further contains an alkaline electrolyte saturated with zinc oxide and a gelling agent.

* * * * *